US012700180B2

(12) United States Patent
   E

(10) Patent No.: US 12,700,180 B2
(45) Date of Patent: Aug. 4, 2026

(54) POSITION DETERMINATION METHOD AND DEVICE

(71) Applicant: Beijing Zitiao Network Technology Co., Ltd., Beijing (CN)

(72) Inventor: Yanzhi E, Beijing (CN)

(73) Assignee: BEIJING ZITIAO NETWORK TECHNOLOGY CO., LTD., Beijing (CN)

( * ) Notice: Subject to any disclaimer, the term of this patent is extended or adjusted under 35 U.S.C. 154(b) by 239 days.

(21) Appl. No.: 18/546,043

(22) PCT Filed: Feb. 10, 2022

(86) PCT No.: PCT/CN2022/075876
   § 371 (c)(1),
   (2) Date: Aug. 10, 2023

(87) PCT Pub. No.: WO2022/171180
   PCT Pub. Date: Aug. 18, 2022

(65) Prior Publication Data
   US 2024/0127541 A1    Apr. 18, 2024

(30) Foreign Application Priority Data
   Feb. 10, 2021    (CN) .......................... 202110184695.3

(51) Int. Cl.
   *G06T 17/20*        (2006.01)
   *G06T 7/13*         (2017.01)
   (Continued)

(52) U.S. Cl.
   CPC ............... *G06T 17/20* (2013.01); *G06T 7/13* (2017.01); *G06T 7/246* (2017.01); *G06T 7/62* (2017.01); *G06T 2207/30241* (2013.01)

(58) Field of Classification Search
   None
   See application file for complete search history.

(56) References Cited

U.S. PATENT DOCUMENTS 8,269,778 B1 * 9/2012 Baraff ..................... G06T 13/20
                                                    345/475
8,786,613 B2 * 7/2014 Millman ................. G06F 30/20
                                                    345/475

(Continued)

FOREIGN PATENT DOCUMENTS

CN          104794742 A     7/2015
CN          105069826 A     11/2015
                (Continued)

OTHER PUBLICATIONS

Apu, R., and Marina Gavrilova. "Modeling Realistic Inflation and Deflations Effect on Closed 3D Geometric Mesh for Computer Animation." GMVAG2005: 1638-1645.*

(Continued)

*Primary Examiner* — Sultana M Zalalee
(74) *Attorney, Agent, or Firm* — Alleman Hall LLP

(57) ABSTRACT

A position determination method includes: constructing a mesh model of an elastic object; in response to a deformation triggering operation for the elastic object, determining deformation information of mesh points in the mesh model of the elastic object; where the deformation information includes a deformation position; determining motion trajectories of the mesh points in the mesh model of the elastic object based on deformation positions of the mesh points and an elastic constraint of the mesh model of the elastic object in a state of the volumetric deformation; and mobilizing, based on the motion trajectories of the mesh points in the mesh model of the elastic object, the mesh model of the elastic object for an elastic motion to cause the elastic object to be subjected to the volumetric deformation. The inflation and deflation effect of the elastic object is ensured. A position determination device is further disclosed.

18 Claims, 4 Drawing Sheets

(51) Int. Cl.
  *G06T 7/246* (2017.01)
  *G06T 7/62* (2017.01)

(56) References Cited

U.S. PATENT DOCUMENTS

| | | | | |
|---|---|---|---|---|
| 2004/0261501 | A1* | 12/2004 | Ng-Thow-Hing | G06T 7/62 |
| | | | | 73/32 R |
| 2005/0046629 | A1* | 3/2005 | Jeong | G06T 13/20 |
| | | | | 345/473 |
| 2006/0265202 | A1* | 11/2006 | Muller-Fischer | G06T 17/00 |
| | | | | 703/6 |
| 2008/0286735 | A1* | 11/2008 | Cusano | G09B 23/30 |
| | | | | 434/267 |
| 2010/0290679 | A1* | 11/2010 | Gasser | G06T 17/20 |
| | | | | 382/128 |
| 2011/0074772 | A1* | 3/2011 | Wada | G06T 19/20 |
| | | | | 345/419 |
| 2012/0215510 | A1* | 8/2012 | Metaxas | G06T 13/20 |
| | | | | 703/9 |
| 2013/0328870 | A1 | 12/2013 | Grenfell | |
| 2015/0029198 | A1 | 1/2015 | Sumner et al. | |
| 2016/0133040 | A1 | 5/2016 | Mitchell et al. | |
| 2016/0267664 | A1* | 9/2016 | Davis | G06T 13/80 |
| 2019/0197205 | A1* | 6/2019 | Schmidt | G06T 17/20 |
| 2020/0161004 | A1* | 5/2020 | Shirazian | A61B 5/055 |
| 2020/0202045 | A1* | 6/2020 | Mehr | G06F 30/27 |
| 2021/0007806 | A1* | 1/2021 | Karade | A61B 34/10 |
| 2022/0138359 | A1* | 5/2022 | Sussner | G06F 30/10 |
| | | | | 703/1 |

FOREIGN PATENT DOCUMENTS

| | | | |
|---|---|---|---|
| CN | 108491636 | A | 9/2018 |
| CN | 110619681 | A | 12/2019 |
| CN | 112233253 | A | 1/2021 |
| CN | 112258653 | A | 1/2021 |
| CN | 112991444 | A | 6/2021 |
| WO | 2020149919 | A1 | 7/2020 |

OTHER PUBLICATIONS

Bender, Jan, et al. "Position-based Methods for the Simulation of Solid Objects in Computer Graphics." Eurographics (State of the Art Reports). 2013.*

China National Intellectual Property Administration, Notice of Allowance Issued in Application No. 202110184695.3, May 24, 2023, 7 pages.

China National Intellectual Property Administration, Office Action Issued in Application No. 202110184695.3, May 6, 2022, 23 pages.

China National Intellectual Property Administration, Office Action Issued in Application No. 202110184695.3, Jan. 28, 2023, 9 pages. Submitted with partial English translation.

ISA China National Intellectual Property Administration, International Search Report and Written Opinion Issued in Application No. PCT/CN2022/075876, Apr. 18, 2022, WIPO, 16 pages.

* cited by examiner

Inflation (a)                                    (b)

Deflation (a)                                    (b)

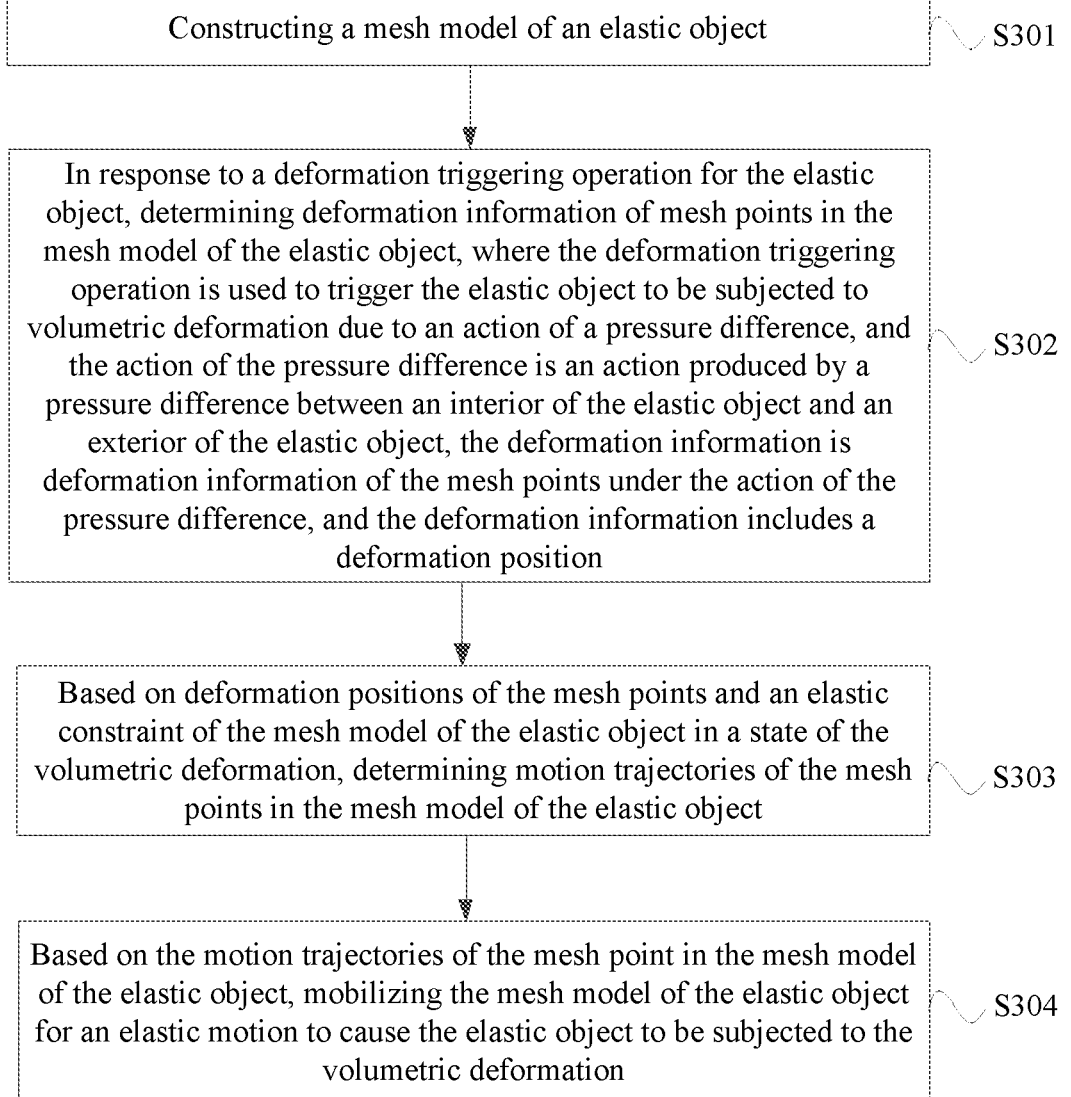

Constructing a mesh model of an elastic object — S301

In response to a deformation triggering operation for the elastic object, determining deformation information of mesh points in the mesh model of the elastic object, where the deformation triggering operation is used to trigger the elastic object to be subjected to volumetric deformation due to an action of a pressure difference, and the action of the pressure difference is an action produced by a pressure difference between an interior of the elastic object and an exterior of the elastic object, the deformation information is deformation information of the mesh points under the action of the pressure difference, and the deformation information includes a deformation position — S302

Based on deformation positions of the mesh points and an elastic constraint of the mesh model of the elastic object in a state of the volumetric deformation, determining motion trajectories of the mesh points in the mesh model of the elastic object — S303

Based on the motion trajectories of the mesh point in the mesh model of the elastic object, mobilizing the mesh model of the elastic object for an elastic motion to cause the elastic object to be subjected to the volumetric deformation — S304

FIG. 3

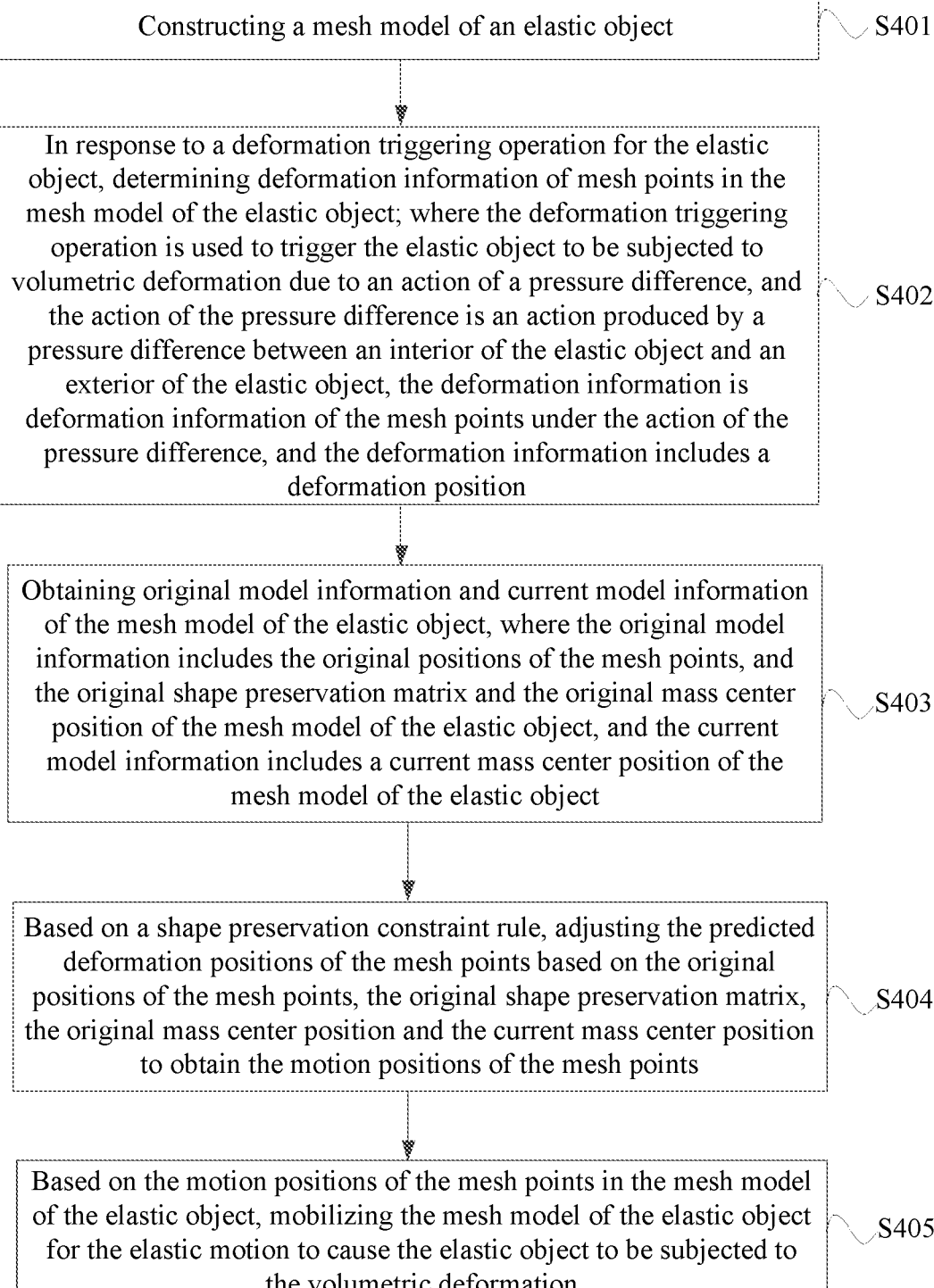

Constructing a mesh model of an elastic object    S401

In response to a deformation triggering operation for the elastic object, determining deformation information of mesh points in the mesh model of the elastic object; where the deformation triggering operation is used to trigger the elastic object to be subjected to volumetric deformation due to an action of a pressure difference, and the action of the pressure difference is an action produced by a pressure difference between an interior of the elastic object and an exterior of the elastic object, the deformation information is deformation information of the mesh points under the action of the pressure difference, and the deformation information includes a deformation position    S402

Obtaining original model information and current model information of the mesh model of the elastic object, where the original model information includes the original positions of the mesh points, and the original shape preservation matrix and the original mass center position of the mesh model of the elastic object, and the current model information includes a current mass center position of the mesh model of the elastic object    S403

Based on a shape preservation constraint rule, adjusting the predicted deformation positions of the mesh points based on the original positions of the mesh points, the original shape preservation matrix, the original mass center position and the current mass center position to obtain the motion positions of the mesh points    S404

Based on the motion positions of the mesh points in the mesh model of the elastic object, mobilizing the mesh model of the elastic object for the elastic motion to cause the elastic object to be subjected to the volumetric deformation    S405

FIG. 4

— — — — Hole mesh edge

• Mesh point

Position determination device 60

601

Model determining module

602

Processing module

701 Processing apparatus

702 ROM

703 RAM

704

705

I/O interface

706 Input apparatus

707 Output apparatus

708 Storage apparatus

709 Communication apparatus

POSITION DETERMINATION METHOD AND DEVICE

CROSS-REFERENCE TO RELATED APPLICATIONS

This application is a national stage of International Application No. PCT/CN2022/075876, filed on Feb. 10, 2022, which claims priority to Chinese patent application No. 202110184695.3, filed on Feb. 10, 2021. Both of the aforementioned applications are hereby incorporated by reference in their entireties.

TECHNICAL FIELD

Embodiments of the present application relate to the field of computer technologies, and in particular, to a position determination method and device.

BACKGROUND

An elastic effect refers to a special effect that can stretch or contract. When the elastic effect is stretched, which is equivalent to inflating, a volume of the elastic effect will increase; and when the elastic effect is contracted, which is equivalent to deflating, the volume of the elastic effect will decrease.

Currently, the elastic effect is generally implemented with a three-dimensional model. During a display process of the elastic effect, the elastic effect will be inflated and/or deflated. In order to achieve the inflation and deflation of the elastic effect, it is necessary to determine positions of mesh points of the 3D model corresponding to the elastic effect at different moments. That is, based on the positions of the mesh points on a current frame image and motion information (for example, velocity) of the mesh points, the positions of the mesh points on a next frame image will be predicted, so as to stretch or contract the 3D model by using the predicted positions of the mesh points, so that the elastic effect can be inflated or deflated, thereby achieving a dynamic display effect of the elastic effect.

However, when the positions of the mesh points in a next video frame are predicted solely based on the motion information of the mesh points, the predicted positions may exhibit a significant deviation, resulting in a significant difference between a shape of the 3D model after stretching or contracting and an initial shape, thereby affecting the inflation and deflation effect of the elastic effect.

SUMMARY

Embodiments of the present disclosure provide a position determination method and device, to improve the accuracy of determining the positions of mesh points, thereby ensuring an inflation and deflation effect of an elastic effect.

In a first aspect, an embodiment of the present disclosure provides a position determination method, including:
constructing a mesh model of an elastic object;
in response to a deformation triggering operation for the elastic object, determining deformation information of mesh points in the mesh model of the elastic object, where the deformation triggering operation is used to trigger the elastic object to be subjected to volumetric deformation due to an action of a pressure difference, the action of the pressure difference is an action produced by a pressure difference between an interior of the elastic object and an exterior of the elastic object, the deformation information is deformation information of the mesh points under the action of the pressure difference, and the deformation information includes a deformation position;
determining motion trajectories of the mesh points in the mesh model of the elastic object based on the deformation positions of the mesh points and an elastic constraint of the mesh model of the elastic object in a state of the volumetric deformation;
mobilizing, based on the motion trajectories of the mesh points in the mesh model of the elastic object, the mesh model of the elastic object for an elastic motion to cause the elastic object to be subjected to the volumetric deformation.

In a second aspect, an embodiment of the present disclosure provides a position determination device, including:
a model determining module, configured to construct a mesh model of an elastic object;
a processing module, configured to determine deformation information of mesh points in the mesh model of the elastic object in response to a deformation triggering operation for the elastic object, where the deformation triggering operation is used to trigger the elastic object to be subjected to volumetric deformation due to an action of a pressure difference, the action of the pressure difference is an action produced by a pressure difference between an interior of the elastic object and an exterior of the elastic object, the deformation information is deformation information of the mesh points under the action of the pressure difference, and the deformation information includes a deformation position;
the processing module being further configured to determine motion trajectories of the mesh points in the mesh model of the elastic object based on the deformation positions of the mesh points and an elastic constraint of the mesh model of the elastic object in a state of the volumetric deformation;
the processing module being further configured to mobilize, based on the motion trajectories of the mesh points in the mesh model of the elastic object, the mesh model of the elastic object for an elastic motion to cause the elastic object to be subjected to the volumetric deformation.

In a third aspect, an embodiment of the present disclosure provides an electronic device, including: at least one processor and a memory;
the memory stores computer execution instructions;
the at least one processor executes the computer execution instructions stored in the memory, to cause the at least one processor to execute the position determination method according to the first aspect and various possible designs of the first aspect.

In a fourth aspect, an embodiment of the present disclosure provides a computer readable storage medium, where the computer readable storage medium stores computer execution instructions; when a processor executes the computer execution instructions, the position determination method according to the first aspect and various possible designs of the first aspect is implemented.

In a fifth aspect, an embodiment of the present disclosure provides a computer program product including a computer program, when the computer program is executed by a processor, the position determination method according to the first aspect and various possible designs of the first aspect is implemented.

In a sixth aspect, an embodiment of the present disclosure provides a computer program, where the computer program is stored in a computer readable storage medium, at least one processor of an electronic device reads the computer program from the computer readable storage medium, and when the computer program is executed by the at least one processor, the position determination method according to the first aspect and various possible designs of the first aspect is implemented.

Embodiments of the present disclosure provides a position determination method and device. Deformation information of mesh points in a mesh model corresponding to an elastic effect is determined when it is determined that an elastic object (i.e., the elastic effect) needs to be inflated or deflated (i.e., needs to be stretched or contracted) to cause the elastic effect to be subjected to volumetric deformation. The deformation information includes a deformation position, and the deformation position of a mesh point represents a position change condition of the mesh point when the mesh point is in a state of the volumetric deformation. After the deformation positions are determined, that is, after an initial prediction of the positions of the mesh points, the deformation positions are constrained and adjusted based on a relevant elastic constraint to obtain motion trajectories of the mesh points, that is, motion positions of the mesh points are obtained, which achieves accurate determination of the positions of the mesh points and improves the accuracy of determining the positions of the mesh points. Hence, after the mesh model of the elastic object is mobilized according to the motion positions of the mesh points to have an elastic motion (i.e., stretching or contracting), a difference between a shape of the mesh model after stretching or contracting and an initial shape of the mesh model is small, and the shape of the mesh model is maintained well, thereby improving the inflation and deflation effect of the elastic object (i.e., the elastic effect), and providing a high user experience.

BRIEF DESCRIPTION OF DRAWINGS

In order to provide a clearer explanation of embodiments of the present disclosure or technical solutions in the prior art, a brief introduction will be given to accompanying drawings required in description of the embodiments or prior art. It is evident that the accompanying drawings in the following description are some embodiments of the present disclosure, and for ordinary technical personnel in the art, other accompanying drawings may be obtained based on these drawings without any creative effort.

FIG. 3 is a first flowchart diagram of a position determination method provided by an embodiment of the present disclosure.

FIG. 4 is a second flowchart diagram of a position determination method provided by an embodiment of the present disclosure.

DESCRIPTION OF EMBODIMENTS

In order to make purposes, technical solutions and advantages of embodiments of the present disclosure clearer, the following will provide a clear and complete description of the technical solutions in the embodiments of the present disclosure in conjunction with accompanying drawings in the embodiments of the present disclosure. Obviously, the described embodiments are a part of the embodiments of the present disclosure, not all of them. Based on the embodiments in the present disclosure, all other embodiments obtained by ordinary technical personnel in the art without creative labor fall within a protection scope of the present disclosure.

Figure 1:
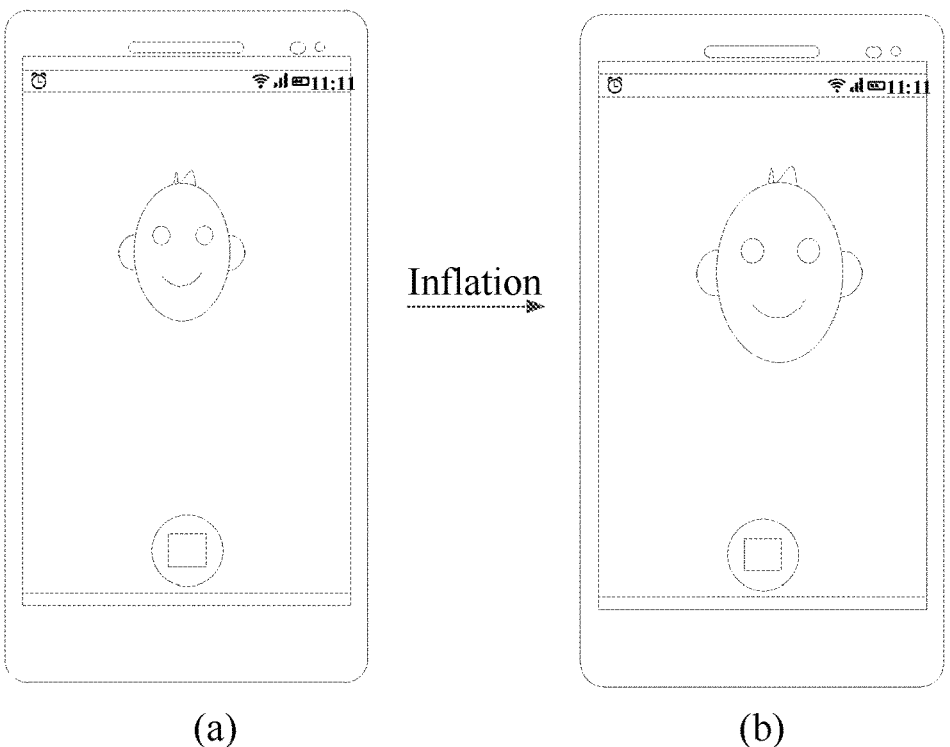
FIG. 1 is a first schematic diagram of special effect display provided by an embodiment of the present disclosure.
Figure 2:
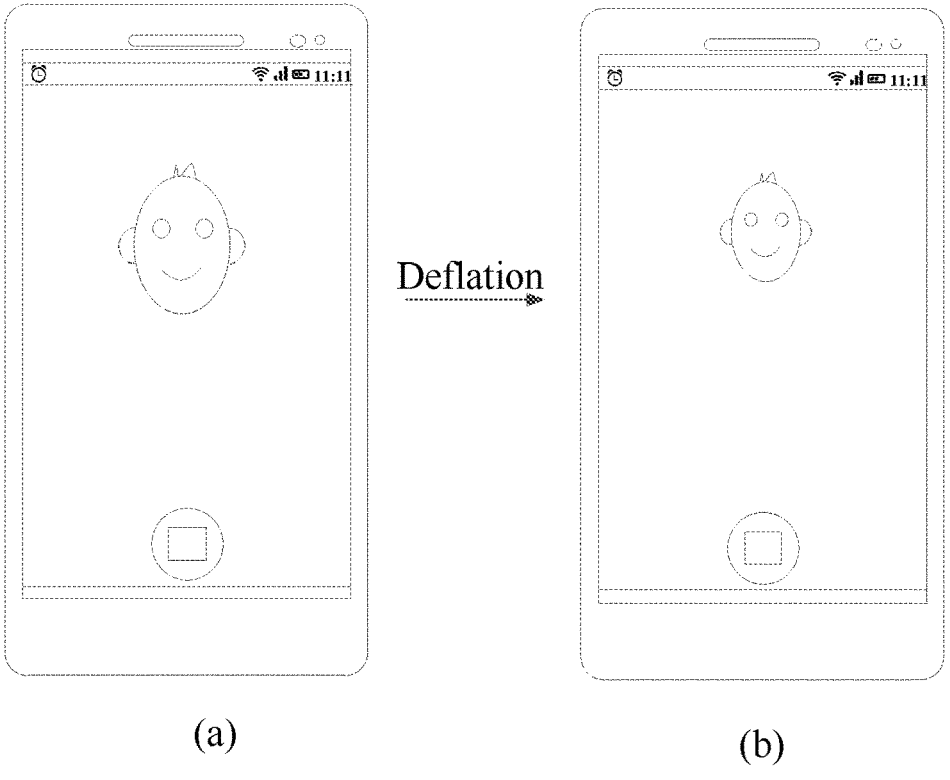
FIG. 2 is a second schematic diagram of special effect display provided by an embodiment of the present disclosure.

When an elastic effect is stretched, which equivalents to inflation, a volume of the elastic effect will increase (as shown in FIG. 1, the elastic effect before inflation is shown in FIG. 1 at (a), and the elastic effect after inflation is shown in FIG. 1 at (b)). When the elastic effect is contracted, which equivalents to deflation, and the volume of the elastic effect will decrease (as shown in FIG. 2, the elastic effect before deflation is shown in FIG. 2 at (a), and the elastic effect after deflation is shown in FIG. 2 at (b)).

At present, in order to achieve the inflation and deflation of the elastic effect, it is required to determine positions of mesh points of a three-dimensional model corresponding to the elastic effect at different moments. That is, based on the positions of the mesh points on a current frame image and motion information of the mesh points, predicted positions of the mesh points on a next video frame are determined, so as to stretch or contract the 3D model by using the predicted positions of the mesh points, causing the elastic effect to stretch or contract, thereby achieving a dynamic display effect of the elastic effect. However, the positions of the mesh points in the next video frame are predicted solely based on the motion information of the mesh points, and in such a case, the predicted positions may have a deviation, resulting in a significant difference between a shape of the 3D model after stretching or contracting and an initial shape, thereby affecting the inflation and deflation effect of the elastic effect.

Therefore, in response to above problems, a technical concept of the present invention is to automatically process hole edges of a mesh model, so that a volume constraint can be established, and a shape preservation constraint is applied to the mesh model corresponding to the elastic effect on each frame of an animation, so as to restore points that are out of shape, thereby accurately predicting and obtaining the positions of the mesh points on the next frame of the animation, ensuring the distortion of local details of the mesh model after inflation and deflation is slight (i.e., a difference from the initial shape is small), avoiding a loss of the local details in the mesh model and ensuring the inflation and deflation effect of the elastic effect.

Referring to FIG. 3, FIG. 3 is a first flowchart diagram of the position determination method provided by an embodiment of the present disclosure. The method of this embodiment can be applied to electronic devices, such as mobile terminals, servers, desktop computers and laptops, and as shown in FIG. 3. The position determination method includes:

S301. Constructing a mesh model of an elastic object.

In the embodiment of the present disclosure, in order to use the mesh model to implement an elastic effect, it is required to construct the elastic effect first, that is, to construct the mesh model of the elastic object for implementing stretching or contracting of the elastic effect with the constructed mesh model.

The mesh model of the elastic object is a three-dimensional model (i.e., 3D model) used for implementing the elastic effect. The mesh model is composed of faces, edges (i.e., mesh edges) and mesh points (i.e., vertices), where the faces are geometric faces on a surface of the mesh model, that is, polygonal faces (for example, triangular faces), and the surface of the 3D model is composed of hundreds or thousands of geometric faces. The edge is any point on the surface of the 3D model where two polygonal faces intersect. And the mesh points (i.e., the vertices) refer to intersections of three or more edges.

In an implementation, the mesh model is an unclosed mesh model, which allows the elastic object to better maintain detailed features of the elastic object (i.e., the mesh model) during a process of inflation or deflation, for example, allowing hair of the elastic object in FIG. 1 at (a) or (b) to maintain its initial shape.

In addition, in an implementation, after the mesh model of the elastic object is constructed, when a user chooses to add the elastic effect, then the elastic object can be added to corresponding image frames.

The image frames can be image frames from videos, games, live broadcasts and the like. For example, if the user chooses to add the elastic effect after capturing a video, then an electronic device adds the elastic effect to the video, that is, the elastic effect is added to the image frames included in the video. When the user plays the video which has been added with the elastic effect, the elastic effect inflates and/or deflates, for example, inflating firstly and then deflating.

S302. In response to a deformation triggering operation for the elastic object, determining deformation information of mesh points in the mesh model of the elastic object, where the deformation triggering operation is used to trigger the elastic object to be subjected to volumetric deformation due to an action of a pressure difference, and the action of the pressure difference is an action produced by a pressure difference between internal and external parts of the elastic object, the deformation information is deformation information of the mesh points under the action of the pressure difference, and the deformation information includes a deformation position.

In the embodiment of the present disclosure, when the deformation triggering operation input by the user is detected, it is indicated that the elastic object on the image frame needs to be inflated or deflated, that is, the mesh model of the elastic object needs to be stretched or contracted. Then the deformation information of the mesh model is determined, and the deformation information can be used for stretching or contracting the mesh model.

In an implementation, the deformation triggering operation may be a special effect adding operation, which is used to indicate adding the elastic effect to an image frame. For example, if the user wants to add the elastic effect during the live broadcast process, then the special effect adding operation can be input to add the elastic effect to the live broadcast screen (i.e., image frames), and the elastic effect will be inflated and deflated. The deformation triggering operation may also be a special effect playing operation, which is used to indicate playing the video which has been added with the elastic effect. For example, when the user wants to play the video which has been added with the elastic effect, the user can select a play button to input the special effect playing operation. Obviously, the deformation triggering operation may also be other types of operations, and they are not limited here.

In an implementation, the deformation information includes a deformation position and velocity (i.e., velocity information), where the deformation position includes a current deformation position of the mesh point and a predicted deformation position of the mesh point, and where the velocity information includes a current motion velocity and a current motion acceleration of a mesh point.

The current deformation position represents a position (i.e., coordinate position) of a mesh point at a current moment (i.e., on a current image frame). The predicted deformation position represents a preliminarily predicted position (i.e., coordinate position) of a mesh point at a next moment (i.e., on a next image frame).

Furthermore, in an implementation, the predicted deformation position is determined according to the current motion velocity and the current motion acceleration of the mesh point. That is, for each mesh point in the mesh model, a preliminary prediction is performed according to the current deformation position and the velocity information of the mesh point to obtain the position of the mesh point on the next frame image, that is, to obtain the position of the mesh point at the next moment, which is determined as the predicted deformation position of the mesh point, thereby implementing the preliminary prediction of the position of the mesh point at the next moment.

In addition, in an implementation, after the predicted deformation positions of the mesh points are obtained, in order to improve accuracy of position determination, a constrained adjustment needs to be made to obtain the motion positions of the mesh points, thereby determining motion trajectories of the mesh points.

In the embodiment of the present disclosure, the elastic object is inflated or deflated, which is equivalent to inflating or deflating a balloon. When the balloon is inflated or deflated, there is a pressure difference between the interior and exterior of the balloon, resulting in an action of the pressure difference, which causes a volume of the balloon to change. When the elastic object is in a state of volumetric deformation, the vertices in the mesh model of the elastic object move, causing mesh edges in the mesh model to extend or shorten, thereby causing the volume of the mesh model to increase or decrease, that is, causing the volume of the elastic object to change.

S303. Based on deformation positions of the mesh points and an elastic constraint of the mesh model of the elastic object in a state of the volumetric deformation, determining motion trajectories of the mesh points in the mesh model of the elastic object.

In the embodiment of the present disclosure, after the deformation positions (i.e., the predicted deformation positions) of the mesh points are obtained, then based on the elastic constraint of the mesh model of the elastic object in the state of the volumetric deformation, the predicted deformation position of each mesh point is constrained and adjusted to obtain the motion position, i.e., the target prediction position, of each mesh point at the next moment, making the predicted positions of the mesh points more reasonable and achieving accurate determination of the points of the mesh points.

In the embodiment of the present disclosure, after the motion positions of the mesh points in the mesh model at the next moment are determined, the motion trajectories of the mesh points can be determined. The motion trajectory of a mesh point is composed of the motion positions of the mesh point at different moments.

In an implementation, the elastic constraint includes a shape preservation constraint and one or more of the following: a volume constraint and an edge distance constraint.

The shape preservation constraint refers to imposing the shape preservation constraint on the mesh model to restore distorted mesh points, that is, to restore the mesh points that have a significant positional deviation, to avoid a loss of local details of the mesh model. The volume constraint refers to imposing the volume constraint on the mesh model so that each mesh point can move along a gradient direction of the volume constraint, in order to accurately determine the positions of the mesh points at the next moment. The edge distance constraint refers to imposing the edge distance constraint to the mesh model to cause the mesh points to move along a stretching/contracting direction to accurately determine the positions of the mesh points at the next moment.

S304. Based on the motion trajectories of the mesh points in the mesh model of the elastic object, mobilizing the mesh model of the elastic object for an elastic motion, to cause the elastic object to be subjected to the volumetric deformation.

In the embodiment of the present disclosure, after the motion position of each mesh point is obtained, the motion trajectory of each mesh point can be determined. Based on the motion trajectory of each mesh point, that is, based on the motion position of each mesh point at the next moment, the mesh model is stretched or contracted to cause the mesh points of the mesh model to move from the current deformation positions to the target predicted positions (i.e., the motion positions), to achieve stretching or contracting of the elastic object, that is, inflation and deflation of the elastic object.

In the embodiment of the present disclosure, when it is required to inflate and deflate the mesh model, after the deformation positions of the mesh points at the next moment are preliminarily determined (i.e., after the predicted deformation positions are obtained), then based on the elastic constraint of the mesh model in the state of the volumetric deformation, the preliminarily predicted positions (i.e., the predicted deformation positions) of the mesh points at the next moment are adjusted, making the adjusted positions of the mesh points at the next moment more reasonable, and the accuracy higher. Hence, when the mesh model is inflated and deflated based on the adjusted positions (i.e., the motion positions) of the mesh points at the next moment, a difference between a shape of the mesh model after inflation and deflation and an initial shape of the mesh model is reduced, which achieves shape preservation of the mesh model, and the inflation and deflation effect of the elastic effect can be achieved.

From the above description, it can be seen that when it is determined that the elastic object (i.e., the elastic effect) needs to be inflated or deflated (i.e., needs to be stretched or contracted) to cause the volume of the elastic effect to change, the deformation information of the mesh points in the mesh model corresponding to the elastic effect is determined. The deformation information includes the deformation position, and deformation position of a mesh point represents a position change condition of the mesh point during the volumetric deformation. After determination of the deformation positions, that is, after an initial prediction of the positions of the mesh points, the deformation positions are constrained and adjusted based on a relevant elastic constraint, to obtain the motion trajectories of the mesh points, that is, to obtain the motion positions of the mesh points, which achieves accurate determination of the positions of the mesh points and improves the accuracy of determining the positions of the mesh points. Therefore, after the mesh model of the elastic object is mobilized based on the motion positions of the mesh points to have an elastic motion, that is, after stretching or contracting, the difference between the shape of the mesh model after stretching or contracting and the initial shape of the mesh model is small, and the shape of the mesh model remains well, thereby improving the inflation and deflation effect of the elastic object (i.e., the elastic effect), and providing a high user experience.

Referring to FIG. 4, FIG. 4 is a second flowchart of the position determination method provided by an embodiment of the present disclosure. On the basis of the embodiment in FIG. 3, when the predicted deformation positions of the mesh points are constrained and adjusted, a shape preservation constraint can be applied to ensure that a shape of the mesh model after an elastic motion is maintained well. This process will be described in detail in the following in conjunction with a specific embodiment, and as shown in FIG. 4, the method includes:

S401. Constructing a mesh model of an elastic object.

In the embodiment of the present disclosure, after the mesh model of the elastic object is successfully constructed, original model information of the mesh model can be determined. The original model information is relevant model information of the mesh model when the mesh model is in an initial state, that is, when no volumetric deformation occurs. For example, when an initial image frame containing an elastic effect is displayed, the model information of the mesh model is the original model information, so that the original model information can be used to determine current model information of the mesh model and motion positions of the mesh points of the mesh model in a subsequent elastic motion.

In an implementation, the original model information of the mesh model includes an original volume of the mesh model, an original mass center position, an original shape preservation matrix, original positions of the mesh points and original lengths of mesh edges.

The original volume is a volume of the mesh model of the elastic object that has not undergone any elastic change (i.e., no volumetric deformation has occurred). A determination process thereof includes: obtaining basic information of the mesh model of the elastic object, where the basic information includes original face information of the mesh model of the elastic object; obtaining internal mesh edge information and hole mesh edge information of the mesh model of the elastic object according to the original face information of the mesh model of the elastic object; and obtaining the original volume of the mesh model of the elastic object according to the internal mesh edge information and the hole mesh edge information.

In the embodiment of the present disclosure, the mesh model of the elastic object is composed of several faces, each face includes multiple mesh edges, and each mesh edge is obtained from two adjacent mesh points, that is, a corresponding mesh edge is obtained by connecting two adjacent mesh points. For example, the faces of the mesh model are geometric faces, such as triangular faces, each of the triangle faces includes three mesh points, and the line segment between two adjacent mesh points of the three mesh points is a mesh edge.

In an implementation, the basic information of the mesh model is some basic information of the constructed mesh model, which can be directly determined during construction of the mesh model.

In an implementation, information of a face of the mesh model includes information of the mesh edges that make up the face. The information of a mesh edge may include the original length of the mesh edge and initial positions of two mesh points corresponding to the mesh edge. That is, the basic information of the mesh model includes the original position, i.e., the position in the initial state, of each mesh point of the mesh model.

Specifically, after the face information of the mesh model is obtained, internal mesh edges and hole mesh edges can be determined based on the information of the mesh edges included in the face, thereby obtaining the internal mesh edge information and the hole mesh edge information.

Here, a hole mesh edge is a mesh edge at a gap of the mesh model (i.e., at a hole), and an internal mesh edge is a mesh edge except for the hole mesh edge, that is, the internal mesh edge is not at a gap of the mesh model.

For a convenience of description, the faces of the constructed mesh model are taken as ordinary faces, that is, the faces in the mesh model without any virtual faces established are the ordinary faces.

Figure 5:
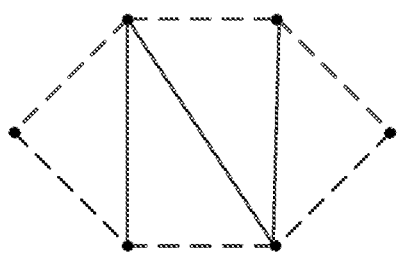
FIG. 5 is a schematic diagram of a hole edge provided by an embodiment of the present disclosure.

Specifically, after the hole mesh edge information is determined, a virtual face is established based on hole mesh edge information, that is, the mesh points of the hole edges are connected based on the geometric shape of the ordinary faces of the mesh model to obtain the corresponding virtual face. As shown in FIG. 5, the shape of faces of the mesh model (i.e., the ordinary faces) is a triangle, and the mesh points of the hole edges are connected based on the triangle to obtain the corresponding virtual faces.

After the virtual faces are established, the volume of the tetrahedron formed by each face in the mesh model (including ordinary and virtual faces) and a preset coordinate origin is calculated, and the volume is a signed volume, and the calculated volume of each tetrahedron is added to obtain the original volume of the mesh model, that is, a volume size of the mesh model in the initial state is obtained.

In an implementation, a process of calculating the original mass center position of the mesh model (coordinates of the mass center of the mesh model in its initial state) includes: obtaining a total mass of the mesh model of the elastic object; and determining the original mass center position of the mesh model based on a preset mesh point mass, the original positions of the mesh points and the total mass of the mesh model of the elastic object.

Specifically, the original mass center position of the mesh model is calculated according to $$cen0 = \sum_{i=1}^{nV} \frac{mV * pos0_i}{M},$$

where $cen0$ is the original mass center position, $nV$ is the number of the mesh points of the mesh model, $pos0_i$ is the original position of the i-th mesh point, $mV$ is the preset mesh point mass, and $M$ is the total mass of the mesh model.

When the mesh model is stretched or contracted, the mass of the mesh points of the mesh model does not change and will always be the preset mesh point mass. A specific value of the preset mesh point mass can be set according to an actual situation, which will not be limited here. The total mass of the mesh model will not change, and the total mass of the mesh model can be pre-set by relevant personnel or be a sum of the masses of all mesh points.

Furthermore, in an implementation, after the original mass center position is obtained through calculation, the original shape preservation matrix of the mesh model can also be determined using the original mass center position, that is, the original shape preservation matrix of the mesh model of the elastic object can be obtained based on the preset mesh point mass, the original positions of the mesh points and the original mass center position.

Specifically, the original shape preservation matrix of the mesh model is calculated according to $$rA0 = \sum_{i=1}^{nV} \left[ mV * (pos0_i - cen0) * (pos0_i - cen0)^T \right],$$

where $rA0$ is the original shape preservation matrix, $mV$ is the preset mesh point mass, $pos0_i$ is the original position of the i-th mesh point, and $cen0$ is the original mass center position.

In addition, in an implementation, an original edge length of a mesh edge can be determined based on the original positions of two mesh points of the mesh edge, that is, the original edge length of the mesh edge (i.e., the edge length of the mesh edge in the initial state) can be calculated according to $rLen=\|pos0_1-pos0_2\|$, where $rLen$ is the original edge length, $pos0_1$ is the original position of one mesh point of the mesh edge, and $pos0_2$ is the original position of the other mesh point of the mesh edge.

S402. In response to a deformation triggering operation for the elastic object, determining deformation information of mesh points in the mesh model of the elastic object; where the deformation triggering operation is used to trigger the elastic object to be subjected to volumetric deformation due to an action of a pressure difference, and the action of the pressure difference is an action produced by a pressure difference between an interior of the elastic object and an exterior of the elastic object, the deformation information is the deformation information of the mesh points under the action of the pressure difference, and the deformation information includes a deformation position.

In the embodiment of the present disclosure, when determining a predicted deformation positions, velocity information of a mesh point can be used to determine, that is, a deformation time interval corresponding to the mesh model of the elastic object can be obtained. Based on a preset display Euler algorithm, the predicted deformation position of a mesh point is obtained according to the deformation time interval and a current motion velocity, a current motion acceleration and a current deformation position of the mesh point.

In the embodiment of the present disclosure, the deformation time interval is obtained, that is, an image frame interval is obtained, where the image frame interval is a time interval between a current frame image and a next image frame. Based on the preset display Euler algorithm, the predicted deformation position of the mesh point is obtained according to the image frame interval and the current motion velocity, the current motion acceleration and the current deformation position of the mesh point.

Specifically, the image frame interval is the time interval between two image frames, that is, the time interval between the image frame displayed at a current moment and the image frame displayed at a next moment, which is equivalent to a time step.

In the embodiment of the present disclosure, for each mesh point, a distance that the mesh point moves within the image frame interval can be determined according to the current motion velocity and the current motion acceleration of the mesh point, and the image frame interval (i.e., the deformation time interval). Therefore, based on the distance and the current deformation position of the mesh point, the position that the mesh point moves to at the next moment can be preliminarily predicted, thereby obtaining the predicted deformation position of the mesh point.

Furthermore, in an implementation, obtaining, based on the preset display Euler algorithm, the predicted deformation position of the mesh point according to the deformation time interval and the current motion velocity, the current motion acceleration and the current deformation position of the mesh point, includes:

calculating the predicted deformation position of the mesh point through $pos1=pos+vel*dt+acc*dt^2$, where $pos1$ is the predicted deformation position of the mesh point, $pos$ is the current deformation position of the mesh point, $vel$ is the current motion velocity of the mesh point, $dt$ is the deformation time interval, and $acc$ is the current motion acceleration of the mesh point.

In the embodiment of the present disclosure, for each mesh point, an initial position prediction can be performed in accordance with $pos1=pos+vel*dt+acc*dt^2$ to obtain the position of the mesh point on the next frame image, that is, the initial predicted position (i.e., the predicted deformation position) of the mesh point.

S403. Obtaining original model information and current model information of the mesh model of the elastic object, where the original model information includes the original positions of the mesh points, and the original shape preservation matrix and the original mass center position of the mesh model of the elastic object, and the current model information includes a current mass center position of the mesh model of the elastic object.

S404. Based on a shape preservation constraint rule, adjusting the predicted deformation positions of the mesh points according to the original positions of the mesh points, the original shape preservation matrix, the original mass center position and the current mass center position, to obtain the motion positions of the mesh points.

In the embodiment of the present disclosure, during a process of displaying the elastic effect, the model information of the mesh model of the elastic object in the current image frame (i.e., the image frame currently displayed) is obtained and used as the current model information.

In an implementation, the current model information includes the current mass center position of the mesh model, the current volume of the mesh model, current normal information of the mesh points and current deformation lengths of the mesh edges of the mesh model. A mesh edge is obtained from two adjacent mesh points. The current mass center position is the coordinates of the mass center of the mesh model at the current moment. And the current normal information of the mesh points includes current normal coordinates of the mesh points, that is, the coordinates of the normals of the mesh points at the current moment.

In the embodiment of the present disclosure, based on the shape preservation constraint rule, the predicted deformation position (i.e., the initial predicted position) of each mesh point in the mesh model is adjusted according to the original model information of the mesh model (that is, the model information in the initial state), and the current model information of the mesh model, to restore the positions of the distorted mesh points, that is, to constrain and adjust the shape of the mesh model, so that the shape of the mesh model is maintained when the mesh model is dynamically inflated or deflated according to the adjusted predicted deformation positions, that is, the distortion of the details of the mesh model is relatively small, thereby improving the display effect of the mesh model, i.e., improving the display effect of the elastic effect.

In the embodiment of the present disclosure, in an implementation, an implementation process of S404 includes:

obtaining a current shape transformation matrix according to the preset mesh point mass, the predicted deformation positions of the mesh points, the current mass center position, the original position of each mesh point and the original mass center position; and adjusting the predicted deformation positions of the mesh points according to the current shape transformation matrix, the original shape preservation matrix, the current mass center position and the original mass center position to obtain the motion positions of the mesh points.

Specifically, the current shape transformation matrix is calculated based on the least squares method, that is, according to $$rA1 = \sum_{i=1}^{nV}\left[mV*(pos1_i - cen1)*(pos0_i - cen0)^T\right],$$

where $rA1$ is the current shape transformation matrix, $nV$ is the number of the mesh points in the mesh model, $mV$ is the preset mesh point mass, $pos1_i$ is the predicted deformation position of the i-th mesh point, $cen1$ is the current mass center position of the mesh model, $pos0_i$ is the original position of the i-th mesh point, and $cen0$ is the original mass center position of the mesh model.

After the current shape transformation matrix is obtained, the motion position of each mesh point is calculated according to $pos_{tgt}=cen1+rA1*rA0^{-1}*(pos0-cen0)$, where $pos_{tgt}$ is the motion position of the mesh point, $rA1$ is the current shape transformation matrix, $rA0^{-1}$ is an inverse matrix of $rA0$, that is, the inverse matrix of the original shape preservation matrix, $pos0$ is the original position of the mesh point, and $cen0$ is the original mass center position of the mesh model.

The number of the mesh points in the mesh model is the number of mesh points included in the mesh model.

A process of determining the current mass center position of the mesh model is similar to the process of determining the original mass center position of the mesh model, and it will not be elaborate herein.

Furthermore, in an implementation, a volume constraint and/or an edge distance constraint can be applied to the mesh model before the shape preservation constraint is applied, so that the obtained motion positions of the mesh points (i.e., target prediction positions) are more accurate, the inflation and deflation process of the elastic effect corresponding to the mesh model is more realistic, and the display effect of the special effect is ensured.

In an implementation, a process of applying the volume constraint on the mesh model is: obtaining a target deformation volume of the mesh model of the elastic object; and adjusting, based on a volume constraint rule, the predicted deformation positions of the mesh points according to the current deformation volume and the target deformation volume to obtain first predicted positions of the mesh points.

When the mesh model needs to be stretched (i.e., needs to be inflated), the target deformation volume is the volume of the mesh model at the end of inflation. And when the mesh model needs to be contracted (i.e., needs to be deflated), the target deformation volume is the volume of the mesh model at the end of deflation.

In an implementation, in order to improve a personalized experience, users can choose a magnification factor or a minification factor. For example, if the user chooses a magnification factor of 2, and the original volume of the mesh model is a, then the target deformation volume is 2a.

Furthermore, in an implementation, adjusting, based on the volume constraint rule, the predicted deformation position of the mesh point according to the current deformation volume and the target deformation volume to obtain the first predicted positions of the mesh points, includes:

obtaining the number of the mesh points for the mesh model of the elastic object;

obtaining a difference between the target deformation volume and the current deformation volume of the mesh model of the elastic object, and determining the difference as a remaining deformation volume;

adjusting the predicted deformation positions of the mesh points according to the current normal information of the mesh points, the remaining deformation volume, and the number of the mesh points to obtain the first predicted positions of the mesh points.

Specifically, for each mesh point, the predicted deformation position (i.e., the initial predicted position) is adjusted according to the current normal coordinates of the mesh point, the remaining deformation volume and the number of the mesh points to obtain the first predicted position of the mesh point, that is $$pos_{t1} = pos1 + \frac{normal * (tvol - vol)}{nV},$$

where $pos_{t1}$ is the first predicted position of the mesh point, $pos1$ is the predicted deformation position of the mesh point, normal is the current normal coordinates of the mesh point, $tvol$ is the target deformation volume, $vol$ is the current deformation volume, and $nV$ is the number of the mesh points.

A process of determining the current deformation volume of the mesh model is similar to the process of determining the original volume of the mesh model, and it will not be elaborated herein.

In addition, when the shape preservation constraint is applied after the volume constraint is applied, the first predicted positions after the application of the volume constraint are directly used for applying the shape preservation constraint. That is, based on the shape preservation constraint rule, the target predicted positions of the mesh points are obtained (i.e., the motion positions of the mesh points are obtained) according to the original mass center position, the original shape preservation matrix, the original positions of the mesh points, the first predicted positions of the mesh points and the current mass center position, that is, the predicted deformation positions used in the determination of the current shape transformation matrix are replaced with the first predicted positions.

In the embodiment of the present disclosure, the predicted deformation positions of the mesh points are updated along a volume constraint gradient direction according to the difference between the current deformation volume and the target deformation volume (i.e., according to the remaining deformation volume), to implement an adjustment of the predicted deformation positions (i.e., the initial predicted positions) of the mesh points, thereby improving the accuracy of the target predicted positions (i.e., the motion positions) of the mesh points subsequently determined.

In an implementation, the process of applying the edge distance constrain on the mesh model is:

obtaining multiple mesh edges corresponding to each mesh point respectively, and selecting a target mesh edge corresponding to each mesh point from the multiple mesh edges corresponding to each mesh point;

adjusting, based on an edge distance constraint rule, the predicted deformation position of each mesh point based on an original length and a current deformation length of the target mesh edge corresponding to each mesh point, to obtain a second predicted position of each mesh point.

In the embodiment of the present disclosure, since one mesh edge of the mesh model is composed of two mesh points, one mesh point corresponds to multiple mesh edges, that is, one same mesh point exists in the mesh points of the multiple mesh edges. When the edge distance constraint is applied, each mesh point is traversed, and one mesh edge is selected from the multiple mesh edges corresponding to that mesh point, and is determined as the target mesh edge corresponding to the mesh point, for adjusting the initial predicted position of the mesh point by using the position of another mesh point on the target mesh edge.

When selecting the target mesh edge, the selection can be performed in a certain order, just ensuring that the predicted deformation position of each mesh point is adjusted by the edge distance constraint. For example, the mesh points are traversed from top to bottom, and left to right, then the mesh edge between a currently accessed mesh point and a next to-be-accessed mesh point is taken as the target mesh edge of the currently accessed mesh point.

Furthermore, in an implementation, adjusting, based on the edge distance constraint rule, the predicted deformation position of each mesh point according to the original length and the current deformation length of the target mesh edge corresponding to each mesh point to obtain the second predicted position of each mesh point, includes:

for each mesh point, obtaining the current deformation position of another mesh point on the target mesh edge corresponding to the mesh point;

determining an elastic change ratio corresponding to the mesh point according to the original length and the current deformation length of the target mesh edge corresponding to the mesh point; and adjusting the predicted deformation position of the mesh point according to the current deformation position of another mesh point and the elastic change ratio corresponding to the mesh point, to obtain the second predicted position of the mesh point.

Specifically, when the edge distance constrain is applied to a mesh point, the second predicted position of the mesh point is calculated according to $$pos_{t2} = pos1_1 + (pos1_1 - pos1_2) * \left( \frac{rLen}{\|pos_1 - pos_2\|} - 1 \right),$$

where $pos_{t2}$ is the second predicted position of the mesh point, $pos_1$ is the predicted deformation position of the mesh point, $pos1_2$ is the predicted deformation position of another mesh point on the target mesh edge corresponding to the mesh point, and rLen is the original edge length of the target mesh edge corresponding to the mesh point.

In addition, when the shape preservation constraint is applied after the application of the edge distance constraint, the second predicted positions to which the edge distance constraint has been applied are directly used for the shape preservation constraint, without using the predicted deformation positions of the mesh points. That is, based on the shape preservation constraint rule, the motion positions of the mesh points are obtained according to the original mass center position, the original shape preservation matrix, the original positions of the mesh points, the second predicted positions of the mesh points and the current mass center position, that is, the predicted deformation positions used in determining the current shape transformation matrix are replaced with the second predicted positions.

It should be noted that the volume constraint may also be applied before the application of the edge distance constraint. Correspondingly, the predicted deformation positions in the formula of applying the edge distance constraint can be replaced with the first predicted positions.

In the embodiment of the present disclosure, the predicted deformation position (i.e., the initial predicted position) of the mesh point is updated along a stretching/contracting direction according to a stretching or contracting ratio of the mesh edge (i.e., the elastic change ratio corresponding to the mesh point), to implement the adjustment of the initial predicted positions of the mesh points, thereby improving the accuracy of the motion positions of the mesh points subsequently determined.

In addition, in an implementation, the volume constraint may also be applied before the application of the edge distance constraint. Correspondingly, when the edge distance constraint is applied after the application of the volume constraint, the first predicted positions to which the volume constraint has been applied are directly used for the shape preservation constraint, without using the initial predicted positions of the mesh points. That is, based on the edge distance constraint rule, the first predicted position of each mesh point is adjusted according to the original length and the current deformation length of the target mesh edge corresponding to each mesh point to obtain the second predicted position of each mesh point.

S405. Based on the motion positions of the mesh points in the mesh model of the elastic object, mobilizing the mesh model of the elastic object for the elastic motion to cause the elastic object to be subjected to the volumetric deformation.

In the embodiment of the present disclosure, after the motion position of a mesh point is obtained, that is, after the position of the mesh point at the next moment is accurately determined, velocity information of a mesh vertex (i.e., the current motion velocity and the current motion acceleration of the mesh point) can be updated based on the current deformation position and the motion position of the mesh point, and the updated current velocity information is the velocity information of the mesh point at the next moment, that is, the current motion velocity and the current motion acceleration at the next moment.

Furthermore, in an implementation, when the current motion acceleration of the mesh point is updated, the current motion velocity of the mesh point (i.e., the current motion velocity that has not been updated) is used as an initial velocity. A motion distance of the mesh portion (i.e., a distance between the current deformation position and the motion position) within an image frame interval time (i.e., within a deformation time interval) can be obtained according to the current deformation position of the mesh point and the position (i.e., the motion position) of the mesh point at the next moment, then the motion acceleration of the mesh point can be determined according to the distance, the initial velocity and the deformation time interval, which will be determined as the updated current motion acceleration of the mesh point.

After obtaining an updated motion acceleration, the updated current motion velocity can be determined by using the updated current motion acceleration.

In this embodiment, after the motion position of the mesh point is obtained, the motion velocity and the motion acceleration of the mesh point are updated by using the motion position, so that when the initial predicted position of the mesh point is subsequently determined by using the updated motion velocity and motion acceleration, the obtained predicted deformation position can be more in line with expectations and more accurate.

Figure 6:
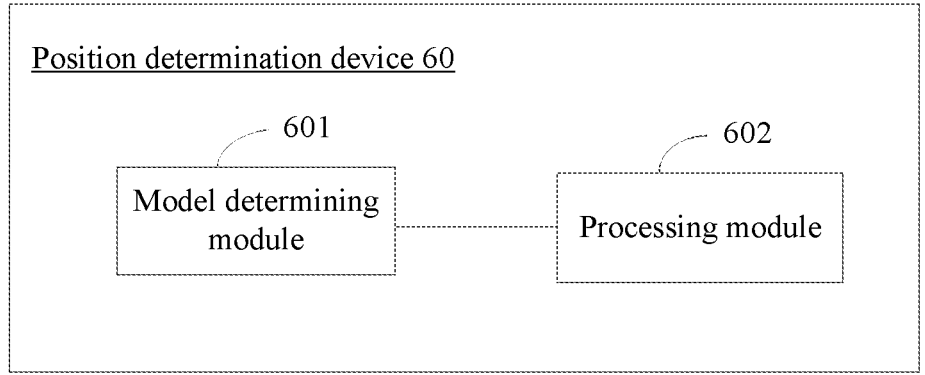
FIG. 6 is a structural block diagram of a position determination device provided by an embodiment of the present disclosure.

Corresponding to the position determination method in the previous embodiment, FIG. 6 is a structural block diagram of a position determination device provided by an embodiment of the present disclosure, and the position determination device is applied to an electronic device. For ease of explanation, only parts related to the embodiment of the present disclosure are shown. Referring to FIG. 6, the device includes: a model determining module 601 and a processing module 602.

The model determining module 601 is configured to construct a mesh model of an elastic object.

The processing module 602 is further configured to determine deformation information of mesh points in the mesh model of the elastic object in response to a deformation triggering operation for the elastic object, where the deformation triggering operation is used to trigger the elastic object to be subjected to volumetric deformation due to an action of a pressure difference, the action of the pressure difference is an action produced by a pressure difference between an interior of the elastic object and an exterior of the elastic object, the deformation information is the deformation information of the mesh points under the action of the pressure difference, and the deformation information includes a deformation position.

The processing module 602 is further configured to determine motion trajectories of the mesh points in the mesh model of the elastic object based on deformation positions of the mesh points and an elastic constraint of the mesh model of the elastic object in a state of the volumetric deformation.

The processing module 602 is further configured to mobilize, based on the motion trajectories of the mesh points in the mesh model of the elastic object, the mesh model of the elastic object for an elastic motion to cause the elastic object to be subjected to the volumetric deformation.

In an embodiment of the present disclosure, the elastic constraint includes a shape preservation constraint, and the deformation position includes a current deformation position and a predicted deformation position. Then, the processing module 602 is further configured to:

obtain original model information and current model information of the mesh model of the elastic object, where the original model information includes original positions of the mesh points, and an original shape preservation matrix and an original mass center position of the mesh model of the elastic object, and the current model information includes a current mass center position of the mesh model of the elastic object;

based on a shape preservation constraint rule, adjust the predicted deformation positions of the mesh points according to the original positions of the mesh points, the original shape preservation matrix, the original mass center position and the current mass center position to obtain motion positions of the mesh points.

In an embodiment of the present disclosure, the processing module 602 is further configured to:

obtain a current shape transformation matrix according to a preset mesh point mass, the predicted deformation positions of the mesh points, the current mass center position, the original position of each mesh point and the original mass center position; and adjust the predicted deformation positions of the mesh points according to the current shape transformation matrix, the original shape preservation matrix, the current mass center position and the original mass center position to obtain the motion positions of the mesh points.

In an embodiment of the present disclosure, the current model information further includes a current deformation volume of the mesh model of the elastic object, and the elastic constraint further includes a volume constraint. Then, the processing module 602 is further configured to:

obtain a target deformation volume of the mesh model of the elastic object before obtaining the original model information and the current model information of the mesh model of the elastic object; and based on a volume constraint rule, adjust the predicted deformation positions of the mesh points according to the current deformation volume and the target deformation volume to obtain first predicted positions of the mesh points.

In an embodiment of the present disclosure, the current model information further includes current normal information of the mesh points, and the processing module 602 is further configured to:

obtain a number of the mesh points for the mesh model of the elastic object;

obtain a difference between the target deformation volume and the current deformation volume of the mesh model of the elastic object, and determine the difference as a remaining deformation volume;

adjust the predicted deformation positions of the mesh points according to the current normal information of the mesh points, the remaining deformation volume, and the number of the mesh points to obtain the first predicted positions of the mesh points.

In an embodiment of the present disclosure, the original model information further includes original lengths of mesh edges in the mesh model of the elastic object, and the current model information further includes current deformation lengths of the mesh edges in the mesh model of the elastic object, where a mesh edge is obtained from two adjacent mesh points, and the elastic constraint further includes an edge distance constraint, and the processing module 602 is further configured to:

obtain multiple mesh edges corresponding to each mesh point respectively, and select a target mesh edge corresponding to each mesh point from the multiple mesh edges corresponding to each mesh point;

based on an edge distance constraint rule, adjust the predicted deformation position of each mesh point according to an original length and a current deformation length of the target mesh edge corresponding to each mesh point to obtain a second predicted position of each mesh point.

In an embodiment of the present disclosure, the processing module 602 is further configured to:

for each mesh point, obtain the current deformation position of another mesh point on the target mesh edge corresponding to the mesh point;

determine an elastic change ratio corresponding to the mesh point according to the original length and the current deformation length of the target mesh edge corresponding to the mesh point; and adjust the predicted deformation position of the mesh point according to the current deformation position of another mesh point and the elastic change ratio corresponding to the mesh point to obtain the second predicted position of the mesh point.

In an embodiment of the present disclosure, the deformation information further includes velocity information, where the velocity information includes a current motion velocity and a current motion acceleration of a mesh point. Therefore, the processing module 602 is further configured to:

obtain a deformation time interval corresponding to the mesh model of the elastic object; and based on a preset display Euler algorithm, obtain the predicted deformation positions of the mesh points according to the deformation time interval and current motion velocities, current motion accelerations and current deformation positions of the mesh points.

In an embodiment of the present disclosure, the processing module 602 is further configured to:

calculate the predicted deformation positions of the mesh points based on $pos1=pos+vel*dt+acc*dt^2$, where $pos1$ is the predicted deformation position of a mesh point, $pos$ is the current deformation position of the mesh point, $vel$ is the current motion velocity of the mesh point, $dt$ is the deformation time interval, and $acc$ is the current motion acceleration of the mesh point.

In an embodiment of the present disclosure, the processing module 602 is further configured to:

update the velocity according to the current deformation positions of the mesh points and the motion positions of the mesh points.

In an embodiment of the present disclosure, the mesh model of the elastic object is an unclosed mesh model, and the processing module 602 is further configured to:

obtain basic information of the mesh model of the elastic object, where the basic information includes original face information of the mesh model of the elastic object;

obtain internal mesh edge information and hole mesh edge information of the mesh model of the elastic object according to the original face information of the mesh model of the elastic object; and obtain an original volume of the mesh model of the elastic object according to the internal mesh edge information and the hole mesh edge information.

In an embodiment of the present disclosure, the processing module 602 is further configured to:

obtain a total mass of the mesh model of the elastic object;

determine an original mass center position of the mesh model according to a preset mesh point mass, the original positions of the mesh points and the total mass of the mesh model of the elastic object;

obtain an original shape preservation matrix of the mesh model of the elastic object based on the preset mesh point mass, the original positions of the mesh points, and the original mass center position.

The device provided by this embodiment can be used to execute the technical solutions of the above method embodiments, and its implementation principle and technical effect are similar, which will not be elaborated in this embodiment.

Figure 7:
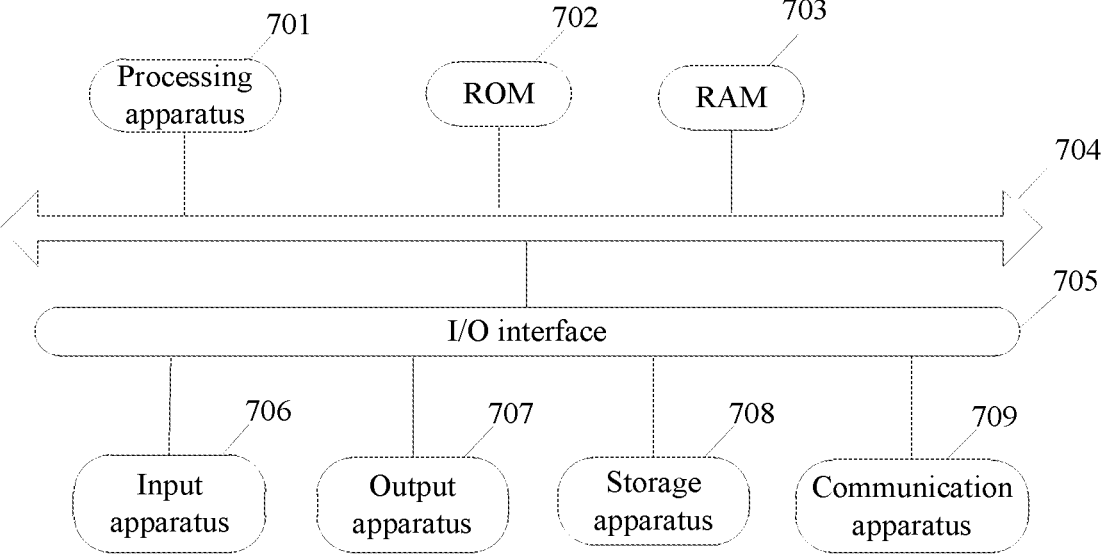
FIG. 7 is a schematic diagram of a hardware structure of an electronic device provided by an embodiment of the present disclosure.

Referring to FIG. 7, a structural schematic diagram of an electronic device 700 suitable for implementing embodiments of the present disclosure is shown, and the electronic device 700 may be a terminal device or a server, where the terminal device may include, but is not limited to, a mobile phone, a notebook computer, a digital broadcast receiver, a personal digital assistant (PDA), a tablet computer (PAD), a portable multimedia player (PMP), an in-vehicle terminal (such as an in-vehicle navigation terminal) and the like, and a stationary terminal such as a digital TV, a desktop computer and the like. The electronic device shown in FIG. 7 is only an example and should not impose any limitations on functions and the scope of use of the embodiments of the present disclosure.

As shown in FIG. 7, the electronic device 700 can include a processing apparatus (for example, a central processing unit, a graphics processor and the like) 701, which may execute various appropriate actions and processing based on a program stored in a read-only memory (ROM) 702 or a program loaded into a random access memory (RAM) 703 from a storage apparatus 708. In the RAM 703, various programs and data necessary for operations of the electronic device 700 are also stored. The processing apparatus 701, the ROM 702 and the RAM 703 are connected to each other through a bus 704. An input/output (I/O) interface 705 is also connected to the bus 704.

Typically, the following apparatuses may be connected to the I/O interface 705: an input apparatus 706 including, for example, a touch screen, a touchpad, a keyboard, a mouse, a camera, a microphone, an accelerometer, a gyroscope and the like; an output apparatus 707 including, for example, a liquid crystal display (LCD), a speaker, a vibrator and the like; a storage apparatus 708, including, for example, a magnetic tape, a hard disk and the like; and a communication apparatus 709. The communication apparatus 709 may allow the electronic device 700 to communicate wirelessly or through wires with other devices to exchange data. While FIG. 7 shows the electronic device 700 having various apparatuses, it should be understood that not all of the illustrated apparatuses are required to be implemented or provided. More or fewer apparatuses may alternatively be implemented or provided.

In particular, according to the embodiments of the present application, the processes described above with reference to the flowcharts may be implemented as a computer software program. For example, an embodiment of the present disclosure includes a computer program product, which includes a computer program carried on a computer-readable medium, the computer program contains program codes for performing the method illustrated in the flowchart. In such an embodiment, the computer program may be downloaded and installed from the network via the communication apparatus 709, or installed from the storage apparatus 706, or installed from the ROM 702. When the computer program is executed by the processing apparatus 701, the above functions defined in the method of the embodiment of the present disclosure are executed.

An embodiment of the present disclosure includes a computer program containing program codes for executing the method shown in the flowchart.

It should be noted that, the computer-readable medium described in the embodiments of the present application may be a computer-readable signal medium or a computer-readable storage medium, or any combination of the above two. The computer-readable storage medium can be, for example, but not limited to, an electrical, magnetic, optical, electromagnetic, infrared or semiconductor system, apparatus or device, or a combination of any of the above. More specific examples of the computer-readable storage medium may include, but are not limited to, an electrical connection with one or more wires, a portable computer disk, a hard disk, a random access memory (RAM), a read only memory (ROM), an erasable programmable read-only memory (EPROM or flash memory), an optical fiber, a portable compact disc read-only memory (CD-ROM), an optical storage device, a magnetic memory device, or any suitable combination of the above. In the embodiments of the present application, the computer-readable storage medium may be any tangible mediums that contain or store a program that can be used by or in conjunction with an instruction execution system, apparatus or device. In embodiments of the present application, the computer-readable signal medium may include a data signal in baseband or propagated as part of a carrier wave, which carries computer-readable program codes. Such propagated data signal may take a variety of forms, including but not limited to an electromagnetic signal, an optical signal or any suitable combination of the above. The computer-readable signal medium can also be any computer-readable medium other than the computer-readable storage medium, and the computer-readable signal medium can transmit, propagate or transport the program for use by or in conjunction with the instruction execution system, apparatus or device. The program codes contained on the computer-readable medium may be transmitted by any suitable medium, including but not limited to: an electric wire, an optical fiber cable, an Radio Frequency (RF) and the like, or any suitable combination of the above.

The computer readable medium mentioned above can be included in the electronic device mentioned above; or it can also exist separately without being assembled into the electronic device.

The computer readable medium mentioned above carries one or more programs, and when the one or more programs executed by the electronic device, the electronic device is caused to execute the method shown in the above embodiment.

Computer program codes for performing the operations of the embodiments of the present disclosure may be written in one or more programming languages, the programming languages include object-oriented programming languages-such as Java, Smalltalk, C++, and also includes conventional procedural programming languages-such as the "C" language, or similar programming languages. The program codes may be executed entirely on a user computer, partly on a user computer, as a stand-alone software package, partly on a user computer and partly on a remote computer, or entirely on a remote computer or a server. In a case where the remote computer is involved, the remote computer may be connected to the user computer through any kind of networks, including a local area network (LAN) or a wide area network (WAN), or may be connected to an external computer (for example, connected via the Internet through an Internet service provider).

An embodiment of the present disclosure also provides a computer program product, including a computer program, and the computer program is used to implement the position determination method provided by the embodiment of the present disclosure when executed.

Flowcharts and block diagrams in the accompanying drawings illustrate an architecture, a functionality, and an operation of possible implementations of systems, methods and computer program products according to various embodiments of the present disclosure. In this regard, each block in the flowcharts or block diagrams may represent a module, a program segment, or a code segment that contains one or more executable instructions used to implement specified logical functions. It should also be noted that, in some alternative implementations, the functions noted in the blocks may occur in an order different from those noted in the accompanying drawings. For example, two blocks shown in succession may, in fact, be executed substantially concurrently, or sometimes be executed in a reverse order, depending upon the functionality involved. It should also be noted that, each block of the block diagrams and/or flowcharts, and combinations of blocks in the block diagrams and/or flowcharts can be implemented in a dedicated hardware-based system that performs the specified functions or operations, or can be implemented in a combination of dedicated hardware and computer instructions.

Units involved in the embodiments of the present application may be implemented in a software manner, and may also be implemented in a hardware manner. Among them, names of the units do not constitute a limitation to the units per se under certain circumstances. For example, a first acquisition unit can also be described as "a unit for obtaining at least two Internet protocol addresses".

The functions described above herein can be at least partially executed by one or more hardware logic components. For example, without limitation, available examples of the hardware logic components include: a field programmable gate arrays (FPGA), an application specific integrated circuits (ASIC), an application specific standard product (ASSP), a system on chip (SOC), a complex programmable logic device (CPLD) and the like.

In the context of this disclosure, a machine readable medium may be a tangible medium that can contain or store programs for use by or in combination with instruction execution systems, apparatus, or devices. The machine readable medium may be a machine readable signal medium or a machine readable storage medium. The machine readable medium may include but is not limited to an electronic, magnetic, optical, electromagnetic, infrared or semiconductor system, apparatus or device, or any suitable combination of the above. More specific examples of the machine readable storage medium may include an electrical connection based on one or more wires, a portable computer disk, a hard drive, a random access memory (RAM), a read-only memory (ROM), an erasable programmable read-only memory (EPROM or flash memory), an optical fiber, a compact disc read-only memory (CD-ROM), an optical storage device, a magnetic storage device, or any suitable combination of the above.

In a first aspect, according to one or more embodiments of the present disclosure, a position determination method is provided, including:

constructing a mesh model of an elastic object;

in response to a deformation triggering operation for the elastic object, determining deformation information of mesh points in the mesh model of the elastic object, where the deformation triggering operation is used to trigger the elastic object to be subjected to volumetric deformation due to an action of a pressure difference, the action of the pressure difference is an action produced by a pressure difference between an interior of the elastic object and an exterior of the elastic object, the deformation information is the deformation information of the mesh points under the action of the pressure difference, and the deformation information includes a deformation position;

determining motion trajectories of the mesh points in the mesh model of the elastic object based on deformation positions of the mesh points and an elastic constraint of the mesh model of the elastic object in a state of the volumetric deformation; and mobilizing, according to the motion trajectories of the mesh points in the mesh model of the elastic object, the mesh model of the elastic object for an elastic motion to cause the elastic object to be subjected to the volumetric deformation.

According to one or more embodiments of the present disclosure, the elastic constraint includes a shape preservation constraint, and the deformation position includes a current deformation position and a predicted deformation position;

the determining the motion trajectories of the mesh points in the mesh model of the elastic object based on the deformation positions of the mesh points and the elastic constraint of the mesh model of the elastic object in the state of the volumetric deformation includes:

obtaining original model information and current model information of the mesh model of the elastic object, where the original model information includes original positions of the mesh points, and an original shape preservation matrix and an original mass center position of the mesh model of the elastic object, and the current model information includes a current mass center position of the mesh model of the elastic object; and adjusting, based on a shape preservation constraint rule, predicted deformation positions of the mesh points according to the original positions of the mesh points, the original shape preservation matrix, the original mass center position and the current mass center position, to obtain motion positions of the mesh points.

According to one or more embodiments of the present disclosure, the adjusting, based on the shape preservation constraint rule, the predicted deformation positions of the mesh points according to the original position of the mesh point, the original shape preservation matrix, the original mass center position and the current mass center position to obtain the motion positions of the mesh points, includes:

obtaining a current shape transformation matrix according to a preset mesh point mass, the predicted deformation positions of the mesh points, the current mass center position, the original position of each mesh point and the original mass center position; and adjusting the predicted deformation positions of the mesh points according to the current shape transformation matrix, the original shape preservation matrix, the current mass center position, and the original mass center position to obtain the motion positions of the mesh points.

According to one or more embodiments of the present disclosure, the current model information further includes a current deformation volume of the mesh model of the elastic object, and the elastic constraint further includes a volume constraint; then before obtaining the original model information and current model information of the mesh model of the elastic object, further include:

obtaining a target deformation volume of the mesh model of the elastic object; and adjusting, based on a volume constraint rule, the predicted deformation positions of the mesh points according to the current deformation volume and the target deformation volume to obtain first predicted positions of the mesh points.

According to one or more embodiments of the present disclosure, the current model information further includes current normal information of the mesh points, the adjusting, based on the volume constraint rule, the predicted deformation positions of the mesh points according to the current deformation volume and the target deformation volume to obtain the first predicted positions of the mesh points includes:

obtaining a number of the mesh points of the mesh model of the elastic object;

obtaining a difference between the target deformation volume and the current deformation volume of the mesh model of the elastic object, and determining the difference as a remaining deformation volume; and adjusting the predicted deformation positions of the mesh points according to the current normal information of the mesh points, the remaining deformation volume and the number of the mesh points to obtain the first predicted positions of the mesh points.

According to one or more embodiments of the present disclosure, the original model information further includes original lengths of mesh edges in the mesh model of the elastic object, and the current model information further includes current deformation lengths of the mesh edges in the mesh model of the elastic object, where a mesh edge is obtained from two adjacent mesh points, and the elastic constraint further includes an edge distance constraint, and before obtaining the original model information and the current model information of the mesh model of the elastic object, further include:

obtaining multiple mesh edges corresponding to each mesh point respectively, and selecting a target mesh edge corresponding to each mesh point from the multiple mesh edges corresponding to each mesh point; and adjusting, based on an edge distance constraint rule, the predicted deformation position of each mesh point according to an original length and a current deformation length of the target mesh edge corresponding to each mesh point to obtain a second predicted position of each mesh point.

According to one or more embodiments of the present disclosure, the adjusting, based on the edge distance constraint rule, the predicted deformation position of each mesh point according to the original length and the current deformation length of the target mesh edge corresponding to each mesh point to obtain the second predicted position of each mesh point includes:

for each mesh point, obtaining the current deformation position of another mesh point on the target mesh edge corresponding to the mesh point;

determining an elastic change ratio corresponding to the mesh point according to the original length and the current deformation length of the target mesh edge corresponding to the mesh point; and adjusting the predicted deformation position of the mesh point according to the current deformation position of another mesh point and the elastic change ratio corresponding to the mesh point to obtain the second predicted position of the mesh point.

According to one or more embodiments of the present disclosure, the deformation information further includes velocity, and the velocity includes a current motion velocity and a current motion acceleration of a mesh point, and the method further includes:

obtaining a deformation time interval corresponding to the mesh model of the elastic object; and obtaining, based on a preset display Euler algorithm, the predicted deformation positions of the mesh points according to the deformation time interval and current motion velocities, current motion accelerations and current deformation positions of the mesh points.

According to one or more embodiments of the present disclosure, the obtaining, based on the preset display Euler algorithm, the predicted deformation positions of the mesh points according to the deformation time interval and the current motion velocities, the current motion accelerations and the current deformation positions of the mesh points includes:

calculating the predicted deformation positions of the mesh points according to $pos1 = pos + vel*dt + acc*dt^2$, where pos1 is the predicted deformation position of the mesh point, pos is the current deformation position of the mesh point, vel is the current motion velocity of the mesh point, dt is the deformation time interval, and acc is the current motion acceleration of the mesh point.

According to one or more embodiments of the present disclosure, the method further includes:

updating the velocity according to the current deformation positions of the mesh points and the motion positions of the mesh points.

According to one or more embodiments of the present disclosure, the mesh model of the elastic object is an unclosed mesh model, and the method further includes:

obtaining basic information of the mesh model of the elastic object, where the basic information includes original face information of the mesh model of the elastic object;

obtaining internal mesh edge information and hole mesh edge information of the mesh model of the elastic object according to the original face information of the mesh model of the elastic object; and obtaining an original volume of the mesh model of the elastic object according to the internal mesh edge information and the hole mesh edge information.

According to one or more embodiments of the present disclosure the method further includes:

obtaining a total mass of the mesh model of the elastic object;

determining an original mass center position of the mesh model according to the preset mesh point mass, the original positions of the mesh points and the total mass of the mesh model of the elastic object;

obtaining the original shape preservation matrix of the mesh model of the elastic object according to the preset mesh point mass, the original positions of the mesh points and the original mass center position.

In a second aspect, according to one or more embodiments of the present disclosure, a position determination device is provided, including:

a model determining module, configured to construct a mesh model of an elastic object;

a processing module, further configured to determine deformation information of mesh points in the mesh model of the elastic object in response to a deformation triggering operation for the elastic object, where the deformation triggering operation is used to trigger the elastic object to be subjected to volumetric deformation due to an action of a pressure difference, the action of the pressure difference is an action produced by a pressure difference between an interior of the elastic object and an exterior of the elastic object, the deformation information is the deformation information of the mesh points under the action of the pressure difference, and the deformation information includes a deformation position;

the processing module being further configured to determine motion trajectories of the mesh points in the mesh model of the elastic object based on deformation positions of the mesh points and an elastic constraint of the mesh model of the elastic object in a state of the volumetric deformation; and the processing module being further configured to mobilize, according to the motion trajectories of the mesh points in the mesh model of the elastic object, the mesh model of the elastic object for an elastic motion to cause the elastic object to be subjected to the volumetric deformation.

According to one or more embodiments of the present disclosure, the elastic constraint includes a shape preservation constraint, and the deformation position includes a current deformation position and a predicted deformation position; and the processing module is further configured to:

obtain original model information and current model information of the mesh model of the elastic object, where the original model information includes original positions of the mesh points, and an original shape preservation matrix and an original mass center position of the mesh model of the elastic object, and the current model information includes a current mass center position of the mesh model of the elastic object;

adjust, based on a shape preservation constraint rule, predicted deformation positions of the mesh points according to the original positions of the mesh points, the original shape preservation matrix, the original mass center position and the current mass center position to obtain motion positions of the mesh points.

According to one or more embodiments of the present disclosure, the processing module is further configured to:

obtain a current shape transformation matrix according to a preset mesh point mass, the predicted deformation positions of the mesh points, the current mass center position, the original position of each mesh point and the original mass center position; and adjust the predicted deformation positions of the mesh points according to the current shape transformation matrix, the original shape preservation matrix, the current mass center position and the original mass center position to obtain the motion positions of the mesh points.

According to one or more embodiments of the present disclosure, the current model information further includes a current deformation volume of the mesh model of the elastic object, and the elastic constraint further includes a volume constraint; and the processing module is further configured to:

obtain a target deformation volume of the mesh model of the elastic object before obtaining the original model information and the current model information of the mesh model of the elastic object; and adjust, based on a volume constraint rule, the predicted deformation positions of the mesh points according to the current deformation volume and the target deformation volume to obtain first predicted positions of the mesh points.

According to one or more embodiments of the present disclosure, the current model information further includes current normal information of the mesh points, and the processing module is further configured to:

obtain a number of the mesh points of the mesh model of the elastic object;

obtain a difference between the target deformation volume and the current deformation volume of the mesh model of the elastic object, and determine the difference as a remaining deformation volume;

adjust the predicted deformation positions of the mesh points according to the current normal information of the mesh points, the remaining deformation volume, and the number of the mesh points to obtain the first predicted positions of the mesh points.

According to one or more embodiments of the present disclosure, the original model information further includes original lengths of mesh edges in the mesh model of the elastic object, and the current model information further includes current deformation lengths of the mesh edges in the mesh model of the elastic object, where a mesh edge is obtained from two adjacent mesh points, and the elastic constraint also includes an edge distance constraint, and the processing module is further configured to:

obtain multiple mesh edges corresponding to each mesh point respectively, and select a target mesh edge corresponding to each mesh point from the multiple mesh edges corresponding to each mesh point;

adjust, based on an edge distance constraint rule, the predicted deformation position of each mesh point according to an original length and a current deformation length of the target mesh edge corresponding to each mesh point to obtain a second predicted position of each mesh point.

According to one or more embodiments of the present disclosure, the processing module is further configured to:

for each mesh point, obtain the current deformation position of another mesh point on the target mesh edge corresponding to the mesh point;

determine an elastic change ratio corresponding to the mesh point according to the original length and the current deformation length of the target mesh edge corresponding to the mesh point; and adjust the predicted deformation position of the mesh point according to the current deformation position of another mesh point and the elastic change ratio corresponding to the mesh point to obtain the second predicted position of the mesh point.

According to one or more embodiments of the present disclosure, the deformation information further includes velocity, where the velocity includes a current motion velocity and a current motion acceleration of a mesh point, and the processing module is further configured to:

obtain a deformation time interval corresponding to the mesh model of the elastic object; and obtain, based on a preset display Euler algorithm, the predicted deformation positions of the mesh points according to the deformation time interval and, current motion velocities, current motion accelerations and current deformation positions of the mesh points.

According to one or more embodiments of the present disclosure, the processing module is further configured to:

calculate the predicted deformation positions of the mesh points according to $pos1=pos+vel*dt+acc*dt^2$, where $pos1$ is the predicted deformation position of a mesh point, $pos$ is the current deformation position of the mesh point, $vel$ is the current motion velocity of the mesh point, $dt$ is the deformation time interval, and $acc$ is the current motion acceleration of the mesh point.

According to one or more embodiments of the present disclosure, the processing module is further configured to:

update the velocity according to the current deformation positions of the mesh points and the motion positions of the mesh points.

According to one or more embodiments of the present disclosure, the mesh model of the elastic object is an unclosed mesh model, and the processing module is further configured to:

obtain basic information of the mesh model of the elastic object, where the basic information includes original face information of the mesh model of the elastic object;

obtain internal mesh edge information and hole mesh edge information of the mesh model of the elastic object according to the original face information of the mesh model of the elastic object; and obtain an original volume of the mesh model of the elastic object according to the internal mesh edge information and the hole mesh edge information.

According to one or more embodiments of the present disclosure, the processing module is further configured to:

obtain a total mass of the mesh model of the elastic object;

determine an original mass center position of the mesh model according to a preset mesh point mass, the original positions of the mesh points and the total mass of the mesh model of the elastic object;

obtain an original shape preservation matrix of the mesh model of the elastic object according to the preset mesh point mass, the original positions of the mesh points, and the original mass center position.

In a third aspect, according to one or more embodiments of the present disclosure, an electronic device is provided, including: at least one processor and a memory;

the memory stores computer execution instructions;

the at least one processor executes the computer execution instructions stored in the memory to cause the at least one processor to execute the position determination method according to the first aspect and various possible designs of the first aspect.

In a fourth aspect, according to one or more embodiments of the present disclosure, a computer readable storage medium is provided, where the computer readable storage medium stores computer execution instructions, and when the computer execution instruction is executed by a processor, the position determination method according to the first aspect and various possible designs of the first aspect is implemented.

In a fifth aspect, according to one or more embodiments of the present disclosure, a computer program product is provided, including a computer program, where when the computer program is executed by a processor, the position determination method according to the first aspect and various possible designs of the first aspect is implemented.

In a sixth aspect, an embodiments of the present disclosure provides a computer program, where the computer is stored in a computer readable storage medium, and at least one processor of an electronic device can read the computer program from the computer readable storage medium, and when the computer program is executed by the at least one processor, the position determination method according to the first aspect and various possible designs of the first aspect is implemented.

The above description only includes preferred embodiments of the present disclosure and an illustration of applied technical principles. Those skilled in the art should understand that, a disclosure scope involved in the present disclosure is not limited to technical solutions formed by the specific combinations of technical features, and should also cover other technical solutions formed by any combination of the above technical features or their equivalent features without departing from the concept of the present disclosure. For example, the technical solution formed by replacing the above features with the technical features with similar functions disclosed in the present disclosure (but not limited thereto).

Furthermore, although various operations are depicted in a specific order, this should not be understood as requiring these operations to be executed in the specific order shown or in a sequential order. In certain environments, multitasking and parallel processing may be advantageous. Similarly, although several specific implementation details are included in the above discussion, these should not be interpreted as limiting the scope of the present disclosure. Some features described in the context of separate embodiments may also be combined and implemented in a single embodiment. On the contrary, various features described in the context of a single embodiment may also be implemented individually or in any suitable sub combination in multiple embodiments.

Although a subject matter has been described in language specific to structural features and/or method logical actions, it should be understood that the subject matter defined in the appended claims may not necessarily be limited to the specific features or actions described above. On the contrary, the specific features and actions described above are only example forms of implementing the claims.

What is claimed is:

1. A position determination method, comprising:

constructing a mesh model of an elastic object, wherein the mesh model of the elastic object is an unclosed mesh model;

in response to a deformation triggering operation for the elastic object, determining deformation information of mesh points in the mesh model of the elastic object, wherein the deformation triggering operation represents inflating and/or deflating the elastic object, the deformation triggering operation is used to trigger the elastic object to be subjected to volumetric deformation due to an action of a pressure difference, the action of the pressure difference is an action produced by a pressure difference between an interior of the elastic object and an exterior of the elastic object, the deformation information is the deformation information of the mesh points under the action of the pressure difference, the deformation information comprises a deformation position, and the deformation position comprises a current deformation position and a predicted deformation position;

after deformation positions of the mesh points are obtained, determining, based on the deformation positions of the mesh points, and an elastic constraint of the mesh model of the elastic object in a state of the volumetric deformation, motion trajectories of the mesh points in the mesh model of the elastic object, wherein the elastic constraint comprises a shape preservation constraint, and the shape preservation constraint represents imposing a shape preservation constraint on the mesh model to restore distorted mesh points, so as to avoid a loss of local details of the mesh model; and mobilizing, based on the motion trajectories of the mesh points in the mesh model of the elastic object, the mesh model of the elastic object for an elastic motion to cause the elastic object to be subjected to the volumetric deformation, wherein the determining, based on the deformation positions of the mesh points, and the elastic constraint of the mesh model of the elastic object in the state of the volumetric deformation, the motion trajectories of the mesh points in the mesh model of the elastic object comprises:

obtaining original model information and current model information of the mesh model of the elastic object, wherein the original model information comprises original positions of the mesh points, an original shape preservation matrix of the mesh model of the elastic object and an original mass center position, and the current model information comprises a current mass center position of the mesh model of the elastic object; and adjusting, based on a shape preservation constraint rule, predicted deformation positions of the mesh points according to the original positions of the mesh points, the original shape preservation matrix, the original mass center position and the current mass center position to obtain motion positions of the mesh points.

2. The method according to claim 1, wherein the adjusting, based on the shape preservation constraint rule, the predicted deformation positions of the mesh points according to the original positions of the mesh points, the original shape preservation matrix, the original mass center position and the current mass center position to obtain the motion positions of the mesh points, comprises:

obtaining a current shape transformation matrix according to a preset mesh point mass, the predicted deformation positions of the mesh points, the current mass center position, the original positions of the mesh points and the original mass center position; and adjusting the predicted deformation positions of the mesh points according to the current shape transformation matrix, the original shape preservation matrix, the current mass center position and the original mass center position to obtain the motion positions of the mesh points.

3. The method according to claim 1, wherein the current model information further comprises a current deformation volume of the mesh model of the elastic object, and the elastic constraint further comprises a volume constraint; then before obtaining the original model information and the current model information of the mesh model of the elastic object, the method further comprises:

obtaining a target deformation volume of the mesh model of the elastic object; and adjusting, based on a volume constraint rule, the predicted deformation positions of the mesh points according to the current deformation volume and the target deformation volume to obtain first predicted positions of the mesh points.

4. The method according to claim 3, wherein the current model information further comprises current normal information of the mesh points, the adjusting, based on the volume constraint rule, the predicted deformation positions of the mesh points according to the current deformation volume and the target deformation volume to obtain the first predicted positions of the mesh points comprises:

obtaining a number of the mesh points of the mesh model of the elastic object;

obtaining a difference between the target deformation volume and the current deformation volume of the mesh model of the elastic object, and determining the difference as a remaining deformation volume; and adjusting the predicted deformation positions of the mesh points according to the current normal information of the mesh points, the remaining deformation volume and the number of the mesh points to obtain the first predicted positions of the mesh points.

5. The method according to claim 1, wherein the original model information further comprises original lengths of mesh edges in the mesh model of the elastic object, the current model information further comprises current deformation lengths of the mesh edges in the mesh model of the elastic object, a mesh edge is obtained from two adjacent mesh points, and the elastic constraint further comprises an edge distance constraint, and before obtaining the original model information and the current model information of the mesh model of the elastic object, the method further comprises:

obtaining multiple mesh edges corresponding to each mesh point respectively, and selecting a target mesh edge corresponding to each mesh point from the multiple mesh edges corresponding to each mesh point respectively; and adjusting, based on an edge distance constraint rule, the predicted deformation position of each mesh point according to an original length and a current deformation length of the target mesh edge corresponding to each mesh point to obtain a second predicted position of each mesh point.

6. The method according to claim 5, wherein the adjusting, based on the edge distance constraint rule, the predicted deformation position of each mesh point according to the original length and the current deformation length of the target mesh edge corresponding to each mesh point to obtain the second predicted position of each mesh point comprises:

for each mesh point, obtaining the current deformation position of another mesh point on the target mesh edge corresponding to the mesh point;

determining an elastic change ratio corresponding to the mesh point according to the original length and the current deformation length of the target mesh edge corresponding to the mesh point; and adjusting the predicted deformation position of the mesh point according to the current deformation position of another mesh point and the elastic change ratio corresponding to the mesh point to obtain the second predicted position of the mesh point.

7. The method according to claim 1, wherein the deformation information further comprises velocity information, and the velocity information comprises a current motion velocity and a current motion acceleration of a mesh point, and the method further comprises:

obtaining a deformation time interval corresponding to the mesh model of the elastic object; and obtaining, based on a preset display Euler algorithm, the predicted deformation positions of the mesh points according to the deformation time interval and current motion velocities, current motion accelerations, and current deformation positions of the mesh points.

8. The method according to claim 7, wherein the obtaining, based on the preset display Euler algorithm, the predicted deformation positions of the mesh points according to the deformation time interval and the current motion velocities, the current motion accelerations and the current deformation positions of the mesh points, comprises:

calculating the predicted deformation positions of the mesh points through $pos1=pos+vel*dt+acc*dt^2$, wherein pos1 is the predicted deformation position of the mesh point, pos is the current deformation position of the mesh point, vel is the current motion velocity of the mesh point, dt is the deformation time interval, and acc is the current motion acceleration of the mesh point.

9. The method according to claim 7, wherein the method further comprises:

updating the velocity information according to current deformation positions of the mesh points and the motion positions of the mesh points.

10. The method according to claim 1, wherein the method further comprises:

obtaining basic information of the mesh model of the elastic object, wherein the basic information comprises original face information of the mesh model of the elastic object;

obtaining internal mesh edge information and hole mesh edge information of the mesh model of the elastic object according to the original face information of the mesh model of the elastic object; and obtaining an original volume of the mesh model of the elastic object according to the internal mesh edge information and the hole mesh edge information.

11. The method according to claim 1, wherein the method further comprises:

obtaining a total mass of the mesh model of the elastic object;

determining the original mass center position of the mesh model according to a preset mesh point mass, the original positions of the mesh points and the total mass of the mesh model of the elastic object;

obtaining the original shape preservation matrix of the mesh model of the elastic object according to the preset mesh point mass, the original positions of the mesh points and the original mass center position.

12. A position determination device, comprising:

at least one processor and a memory, wherein the memory stores computer execution instructions, and the at least one processor executes the computer execution instructions stored in the memory to cause the at least one processor to:

construct a mesh model of an elastic object, wherein the mesh model of the elastic object is an unclosed mesh model;

determine deformation information of mesh points in the mesh model of the elastic object in response to a deformation triggering operation for the elastic object, wherein the deformation triggering operation represents inflating and/or deflating the elastic object, the deformation triggering operation is used to trigger the elastic object to be subjected to volumetric deformation due to an action of a pressure difference, the action of the pressure difference is an action produced by a pressure difference between an interior of the elastic object and an exterior of the elastic object, the deformation information is the deformation information of the mesh points under the action of the pressure difference, the deformation information comprises a deformation position, and the deformation position comprises a current deformation position and a predicted deformation position;

after deformation positions of the mesh points are obtained, determine motion trajectories of the mesh points in the mesh model of the elastic object based on the deformation positions of the mesh points and an elastic constraint of the mesh model of the elastic object in a state of the volumetric deformation, wherein the elastic constraint comprises a shape preservation constraint, and the shape preservation constraint represents imposing a shape preservation constraint on the mesh model to restore distorted mesh points, so as to avoid a loss of local details of the mesh model;

mobilize, based on the motion trajectories of the mesh points in the mesh model of the elastic object, the mesh model of the elastic object for an elastic motion to cause the elastic object to be subjected to the volumetric deformation;

obtain original model information and current model information of the mesh model of the elastic object, wherein the original model information comprises original positions of the mesh points, an original shape preservation matrix of the mesh model of the elastic object and an original mass center position, and the current model information comprises a current mass center position of the mesh model of the elastic object; and adjust, based on a shape preservation constraint rule, predicted deformation positions of the mesh points according to the original positions of the mesh points, the original shape preservation matrix, the original mass center position and the current mass center position to obtain motion positions of the mesh points.

13. The device according to claim 12, wherein the at least one processor is further caused to:

obtain a current shape transformation matrix according to a preset mesh point mass, the predicted deformation positions of the mesh points, the current mass center position, the original positions of the mesh points and the original mass center position; and adjust the predicted deformation positions of the mesh points according to the current shape transformation matrix, the original shape preservation matrix, the current mass center position and the original mass center position to obtain the motion positions of the mesh points.

14. The device according to claim 12, wherein the current model information further comprises a current deformation volume of the mesh model of the elastic object, and the elastic constraint further comprises a volume constraint, and the at least one processor is further caused to:

obtain a target deformation volume of the mesh model of the elastic object; and adjust, based on a volume constraint rule, the predicted deformation positions of the mesh points according to the current deformation volume and the target deformation volume to obtain first predicted positions of the mesh points.

15. The device according to claim 14, wherein the current model information further comprises current normal information of the mesh points, and the at least one processor is further caused to:

obtain a number of the mesh points of the mesh model of the elastic object;

obtain a difference between the target deformation volume and the current deformation volume of the mesh model of the elastic object, and determine the difference as a remaining deformation volume; and adjust the predicted deformation positions of the mesh points according to the current normal information of the mesh points, the remaining deformation volume and the number of the mesh points to obtain the first predicted positions of the mesh points.

16. The device according to claim 12, wherein the original model information further comprises original lengths of mesh edges in the mesh model of the elastic object, the current model information further comprises current deformation lengths of the mesh edges in the mesh model of the elastic object, a mesh edge is obtained from two adjacent mesh points, and the elastic constraint further comprises an edge distance constraint, and the at least one processor is further caused to:

obtain multiple mesh edges corresponding to each mesh point respectively, and select a target mesh edge corresponding to each mesh point from the multiple mesh edges corresponding to each mesh point respectively; and adjust, based on an edge distance constraint rule, the predicted deformation position of each mesh point according to an original length and a current deformation length of the target mesh edge corresponding to each mesh point to obtain a second predicted position of each mesh point.

17. The device according to claim 16, wherein the at least one processor is further caused to:

for each mesh point, obtain the current deformation position of another mesh point on the target mesh edge corresponding to the mesh point;

determine an elastic change ratio corresponding to the mesh point according to the original length and the current deformation length of the target mesh edge corresponding to the mesh point; and adjust the predicted deformation position of the mesh point according to the current deformation position of another mesh point and the elastic change ratio corresponding to the mesh point to obtain the second predicted position of the mesh point.

18. A non-transitory computer readable storage medium, wherein the computer readable storage medium stores computer execution instructions, and when the computer execution instructions are executed by a processor, the processor is caused to:

construct a mesh model of an elastic object, wherein the mesh model of the elastic object is an unclosed mesh model;

determine deformation information of mesh points in the mesh model of the elastic object in response to a deformation triggering operation for the elastic object, wherein the deformation triggering operation represents inflating and/or deflating the elastic object, the deformation triggering operation is used to trigger the elastic object to be subjected to volumetric deformation due to an action of a pressure difference, the action of the pressure difference is an action produced by a pressure difference between an interior of the elastic object and an exterior of the elastic object, the deformation information is the deformation information of the mesh points under the action of the pressure difference, the deformation information comprises a deformation position, and the deformation position comprises a current deformation position and a predicted deformation position;

after deformation positions of the mesh points are obtained, determine motion trajectories of the mesh points in the mesh model of the elastic object based on the deformation positions of the mesh points and an elastic constraint of the mesh model of the elastic object in a state of the volumetric deformation, wherein the elastic constraint comprises a shape preservation constraint, and the shape preservation constraint represents imposing a shape preservation constraint on the mesh model to restore distorted mesh points, so as to avoid a loss of local details of the mesh model;

mobilize, based on the motion trajectories of the mesh points in the mesh model of the elastic object, the mesh model of the elastic object for an elastic motion to cause the elastic object to be subjected to the volumetric deformation;

obtain original model information and current model information of the mesh model of the elastic object, wherein the original model information comprises original positions of the mesh points, an original shape preservation matrix of the mesh model of the elastic object and an original mass center position, and the current model information comprises a current mass center position of the mesh model of the elastic object; and adjust, based on a shape preservation constraint rule, predicted deformation positions of the mesh points according to the original positions of the mesh points, the original shape preservation matrix, the original mass center position and the current mass center position to obtain motion positions of the mesh points.

* * * * *